United States Patent [19]

Yamada et al.

[11] Patent Number: 5,278,011
[45] Date of Patent: Jan. 11, 1994

[54] REVERSIBLE OPTICAL INFORMATION-RECORDING MEDIUM

[75] Inventors: Noboru Yamada; Kunio Kimura, both of Hirakata; Masatoshi Takao; Susumu Sanai, both of Osaka, all of Japan

[73] Assignee: Matsushita Electric Industrial Co., Ltd., Osaka, Japan

[21] Appl. No.: 53,346

[22] Filed: Apr. 28, 1993

Related U.S. Application Data

[60] Continuation of Ser. No. 832,646, Feb. 10, 1992, abandoned, which is a continuation of Ser. No. 644,420, Jan. 22, 1991, abandoned, which is a continuation of Ser. No. 204,883, Jun. 10, 1988, abandoned, which is a division of Ser. No. 909,673, Sep. 22, 1986, abandoned.

[30] Foreign Application Priority Data

| Sep. 25, 1985 | [JP] | Japan | 60-211470 |
| Sep. 25, 1985 | [JP] | Japan | 60-211471 |
| Mar. 11, 1986 | [JP] | Japan | 61-53033 |
| Mar. 11, 1986 | [JP] | Japan | 61-53034 |

[51] Int. Cl.$^5$ .................. G03C 1/72; G11B 7/24
[52] U.S. Cl. .................. 430/19; 430/346; 430/348; 430/495; 430/945; 346/135.1; 346/76 L
[58] Field of Search .................. 430/19, 495, 945, 346, 430/270, 348; 346/135.1, 76 L

[56] References Cited

U.S. PATENT DOCUMENTS

| 3,530,441 | 9/1970 | Ovshinsky | 430/21 |
| 3,983,542 | 9/1976 | Ovshinsky | 430/346 |
| 4,637,976 | 1/1987 | Terao et al. | 430/523 |
| 4,656,079 | 4/1987 | Yamada et al. | 430/945 |
| 4,670,345 | 6/1977 | Morimoto et al. | 430/945 |
| 4,769,311 | 9/1988 | Terao et al. | 430/495 |
| 4,787,077 | 11/1988 | Barton et al. | 430/945 |
| 5,024,910 | 6/1991 | Ohta et al. | 430/17 |
| 5,238,572 | 8/1992 | Koshino et al. | 430/945 |

FOREIGN PATENT DOCUMENTS

| 0128616 | 12/1984 | European Pat. Off. |
| 0153807 | 9/1985 | European Pat. Off. |
| 0169367 | 1/1986 | European Pat. Off. |
| 0155496 | 8/1925 | Japan | 430/290 |
| 0034897 | 2/1985 | Japan | 430/19 |
| 0048397 | 3/1985 | Japan | 430/290 |
| 1031291 | 2/1986 | Japan | 346/135.1 |
| 61-089889 | 5/1986 | Japan |
| 1089889 | 5/1986 | Japan | 346/135.1 |

OTHER PUBLICATIONS

Yamada et al., SPIE vol. 695, pp. 76–85, 1986 *Te–Ge–S-n–Au Phase Change Recording Film for Optical Disk*.
Bardas et al., Thermochimica Acta, 107 (1986) 239–265 *Phase Diagram of the Ternary System Ge–Sb–Te. II. The Subternary Ge–Ge–Te–$Sb_2Te_3$–Sb*.
Legendre et al. Thermochimica Acta, 78 (1984) 141–157 *Phase Diagram of The Ternary System Ge–Sb–Te. I. The Subternary GeTe–$Sb_2Te_3$–Te*.
Chen et al., Appl. Phys. Lett. 49(9) Sep. 1, 1986 502–504 *Compound Materials for Reversible Phase–change Optical Data Storage*.

Primary Examiner—Lee C. Wright
Attorney, Agent, or Firm—Stevens, Davis, Miller & Mosher

[57] ABSTRACT

Phase-change type, reversible optical information recording medium, being possible for recording, reproducing, erasing, and rewriting of information, by use of a laser beam. This invention consists of recording thin film of ternary elements, for example, containing Ge, Te, Sb/or Bi or quaternary elements containing the fourth element of Se with which a part of Te is replaced, which is established on such surface-flat substrates as glass or plastics. In this case, the component ratio of Te and Se is selected not to be excess for other elements, such as Ge, Sb/or Bi so as to be fixed as stable compounds of stoichiometric compositions of GeTe, $Sb_2Te_3$/or $Bi_2Te_3$, or GeSe, $Sb_2Se_3$/$Bi_2Se_3$ when crystallized. Strictly speaking, a concentration of each component is selected to have proper ratio of the number of atomes each other so as to represent whole composition as the sum of each component. By this treatment, it is possible to have high crystallization speed and long cyclability of recording/erasing. The effect of Se is to increase the viscosity of the system and to make easily to obtain amorphous state; and moreover, by selecting of proper amount displaced with Te, it is possible to obtain the composition of recoding film superior in both characteristics of recording (amorphization) and erasing (crystallization).

3 Claims, 6 Drawing Sheets

REVERSIBLE OPTICAL INFORMATION-RECORDING MEDIUM

This application is a continuation of application Ser. No. 07/832,646, filed Feb. 10, 1992, now abandoned which in turn is a continuation of application Ser. No. 07/644,420, filed Jan. 22, 1991, now abandoned, which in turn is a continuation of application Ser. No. 07/204,883, filed Jun. 10, 1988, now abandoned, which in turn is a division of application Ser. No. 06/909,673, filed Sep. 22, 1986, now abandoned.

BACKGROUND OF THE INVENTION

1. Field of Invention

The present invention relates to phase-change type, reversible optical information-recording medium, being possible for recording, reproducing, erasing, and re-writing of information, by use of a laser beam.

2. Description of the Prior Arts

It is well known that some kinds of Te-based alloy film produce comparatively easily reversible phase transition by irradiation of a laser beam. Since, among them, the composition rich in Te-component makes it possible to obtain an amorphous state by relatively low power of laser, the application to recording medium has been so far tried.

For example, S. R. Ovsinsky et al. have first disclosed in U.S. Pat. No. 3,530,441 that such thin films as $Te_{85}Ge_{15}$ and $Te_{81}Ge_{15}S_2Sb_2$ produce a reversible phase-transition according to light with high density energy such as a laser beam. A. W. Smith has also disclosed a film of $Te_{92}Ge_2As_5$ as a typical composition, and he has clarified that it could make recording (amorphization) and erasing (crystallization) runs of about $10^4$ times, and erasing (Applied Physics Letters, 18 (1971) p. 254). Moreover M. Chen et al. have disclosed that a film of $Te_{87}Ge_8Sn_5$ as a typical composition could make repeating runs of more than $10^6$ times in a static test (Applied Physics Letters, 46 (1985) p. 734). Generally, in the recording medium utilizing the phase change between amorphous state and crystalline state, the procedure of the transition from crystal to amorphous state is used to recording process, attaching importance to recording speed. Since the above-mentioned compositions utilize those near eutectic mixture of Te and additives, they have lower melting points of about 400° C. and can be easily amorphized. On the other hand, in erasing run, the procedure from amorphous state to crystal is used; since there exist many free Te-chain-structures inside each above-mentioned composition, progress of crystallization is obstructed by them. Therefore, as the chains at random direction remain inside even after solidification, it is necessary to keep the amorphous state for sufficiently long time and at high temperature (near Tg) in order to arrange the orientation, namely obtain the perfect crystalline state. There was a problem that the composition rich in Te could not in principle increase the erasing speed.

The existence of free Te reduces long-term thermal stability, particularly after repeating of recording/erasing run, and moreover it becomes a cause to restrict the cycling number itself. Though, it is assumed that in a thin film at "as deposited" state, Te atoms are uniformly dispersed with other atoms in a film, there occurs, during the repeating runs of recording/erasing, the separation between a part very rich in Te (relatively lower melting point) and a part rich in stable compound of Te and the additives (relatively higher melting point). Therefore, there occurs the phase separation and then the recording characteristics change. In this case, the composition with extremely abundant Te is very unstable as amorphous state with low crystallization temperature, and also gives a result to reduce the thermal stability. This phenomenon is assumed that it is mainly due to the fact that the composition near eutectic point could not exist as the stable compound and then it would transfer to more stable state in terms of internal energy. In the case of the extreme difference of characteristics, especially melting point, between Te and stoichiometric Te compound with additives produced by crystallization, the phase segregation proceeds more quickly, and it is difficult for separated phase to return again to the original uniform state. As a result, the recording and erasing could not be performed. As a way to solve the problem, it is necessary to increse the laser power, keep the film at a temperature above melting points of Te and Te compound for a long time, and quench after mixing them well again; by such treatments meaning of increasing sensitivity of recording by using excessive Te has come to be in vain. It has been impossible to realize the above treatments actually in dynamic system. Namely, in the composition excessive in Te, it could not be realized to obtain the satisfied characteristics such as the rewriting speed, thermal stability, and cyclability.

BRIEF SUMMARY OF THE INVENTION

The object of this invention is to supply a reversible optical information-recording medium with the improved erasing speed without reduction of recording sensitivity. Also, the other object of this invention is to supply a reversible optical information-recording medium with long cyclability of recording erasing. Moreover, the other object is to supply a reversible optical information-recording medium unchangeable in thermal stability and with high reliability even after repeating runs of recording and erasing.

DESCRIPTION OF THE PREFERRED EMBODIMENTS

Figure 1A:
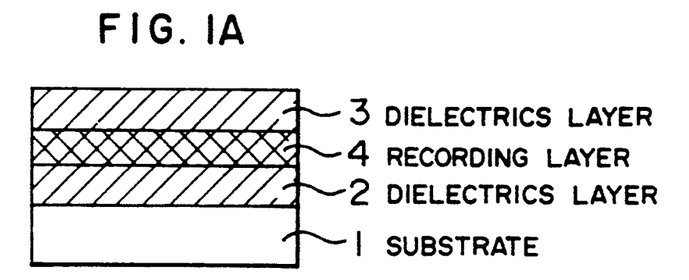
FIG. 1 is a cross section showing the structure of working example for reversible optical information-recording medium of this invention.
Figure 1B:
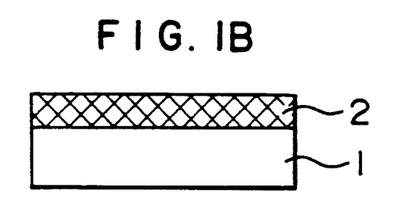
Figure 1C:
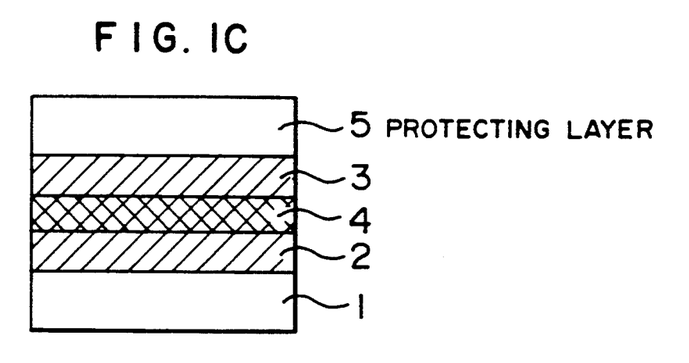

As shown in a~c in FIG. 1, an optical information-recording medium of this invention consists of a recording layer (4) sandwiched by dielectric thin films (2, 3) such as $SiO_2$, $Al_2O_3$, ZnS on substrate (1) with flat surface, made of plastics such as PMMA and polycarbonate, metals such as Al and Cu or glass, etc. In this invention, the dielectric layer is not always necessary, but it is effective in reducing thermal damage of plastic materials or the transformation and evaporation of the recording layer itself caused by repeating irradiation of laser beam. It is also possible to stick a protecting plate on this layer.

Figure 2A:
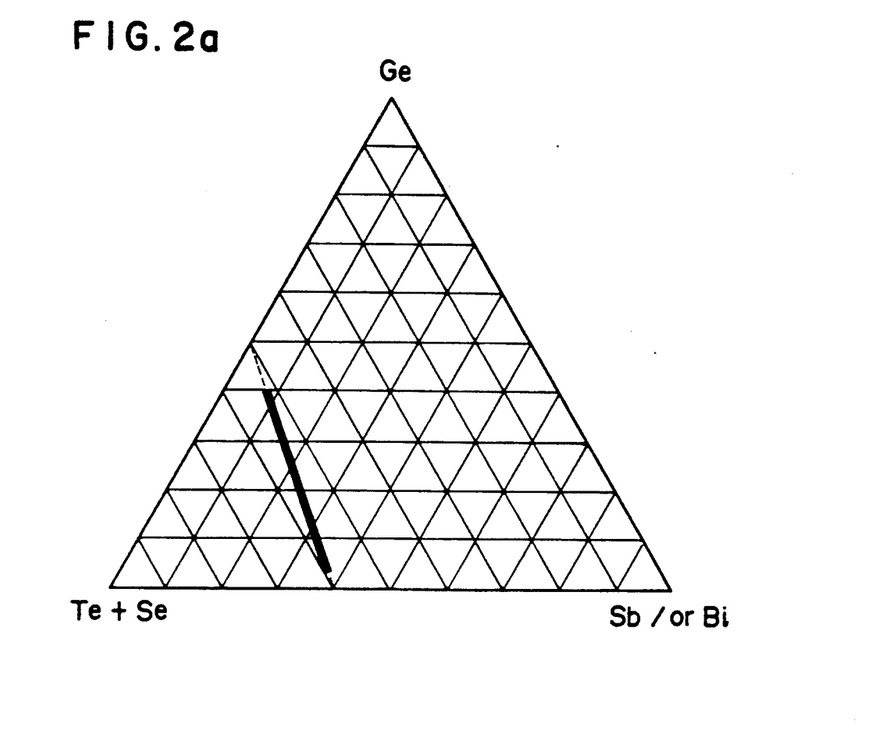
FIG. 2 is the main composition of recording film applied to reversible optical information-recording medium of this invention and the composition diagram showing a tolerance of composition.

This invention is characterized by a recording layer. For example, a recording layer consists of ternary elements containing Te, Ge, Sb/or Bi, or quaternary elements containing the fourth element of Se with which a part of Te is replaced. As shown by a thick line in FIG. 2(a), the main composition is located on the line linking the composition points of $Ge_{50}Te_{50}$ and $Sb_2Te_3$/or $Bi_2Te_3$. In this invention, the main composition is shown by the following formula:

$x \cdot 50Ge(Te,Se) + (1-x) \cdot 20Sb_2(Te,Se)_3$ or $(1-x) \cdot 20Bi(Te,Se)_3$ or $(Te,Se)_{60-10x}Ge_{50x}(Sb/or\ Bi)_{40-40x}$ (wherein $0.05 \leq x \leq 0.8$)

Figure 2B:
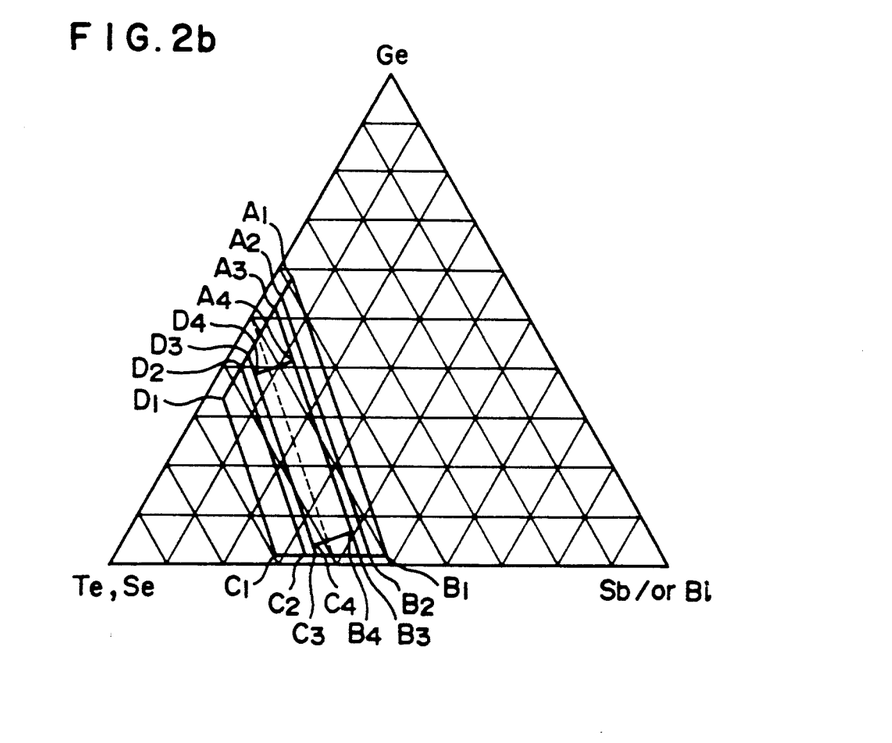

Here, the concentration of Se is not related to the value of x, and it is 30 atomic % or less of whole, namely its maximum value is 30 atomic %. Each composition is permitted to have some range as shown in FIG. 2(b) as a domain.

The following is to describe the fundamental concept, the concrete constituent elements in the recording layer, and the reason for the decision of its concentration regarding the recording medium of this invention.

First, when Te is contained more excessively than necessary amount for formation of stoichiometric compounds with other additives in a recording film of Te phase-change type, it becomes a cause to restrict the erasing speed (crystallization speed), thermal stability, and cyclability, as already mentioned. Therefore, the method with non-excessive Te by devising concentrations of the additives should be taken.

However, Te alloy with only one kind of additive element, such as CdTe, SnTe, PbTe, InTe, $Sb_2Te_3$, and GeTe, is unsuitable for a recording layer by one or all of the following reasons:

1) as the melting point is too high, it could not be easily melted by a short pulse of light of a laser beam,
2) as the crystallization temperature is too low, the stable amorphous could not be obtained, and
3) as the crystallization rate is too high, the sufficient conditions for rapid cooling which are necessary for amorphous conversion could not be easily obtained. Among them, GeTe has a stable amorphous phase and a relatively low melting point of 725° C. comparing with other systems. However, it is also difficult to amorphize (recording) under consideration of power output (25 mW at most) by the present commercial laser diode.

Then, the methods using plural additives have been tried. The trial is to lower the melting point by composing solid solution of plural Te-alloys and, at the same time, to make amorphous phase stable. It is not enough to make solid solution with low melting point, but it is necessary to obtain the solid solution to be difficult in bringing about phase-separation by repeating run of recording/erasing and to have sufficiently high (not too high) crystallization rate.

In this invention, for example, by use of two kinds of additives, such as Ge and Sb/or Bi, the good systems with relatively lower melting point, stable amorphous phase, and high crystallization rate, could be obtained. Regarding crystallization as all Te is fixed as stoichiometric compounds such as GeTe and $Sb_2Te_3$/or $Bi_2Te_3$, the crystallization rate is higher than the case of excessive Te. However, it should be emphasized that there are several important points which are remarkable and unique, in this system, as follows:

As the first point, there exists an intermediate phase between phases of both ends; for example, between GeTe and $Sb_2Te_3$/or $Bi_2Te_3$, there are plural stoichiometric compounds, such as $GeSb_4Te_7$/or $GeBi_4Te_7$ ($GeTe + 2Sb_2Te_3$/or $2Bi_2Te_3$), $GeSb_2Te_4$/or $GeBi_2Te_4$ ($GeTe + Sb_2Te_3$/or $Bi_2Te_3$), and $Ge_2Sb_2Te_5$/or $Ge_2Bi_2Te_5$ ($2GeTe + Sb_2Te_3$/or $Bi_2Te_3$). It is assumed that it is able to obtain a very high crystallization rate, because the internal energy in the crystal state is lower in a stoichiometric phase and the difference of energy level for an amorphous phase is larger.

As the second point, the above-mentioned compounds have mutually similar crystal structures, and have very close characteristics. This fact affords the following effect: even if the composition of film would not strictly coincide with one phase of the above-mentioned stoichiometric compounds, characteristics are uniform throughout broad range of composition as a whole, as the whole could be regarded as the mixture of the above-mentioned three phases. Therefore, there is a merit that there is almost no change in the film characteristics, even if the phase separation has occurred by the repeating runs of recording/erasing, except the case of which the complete separation up to the composition at both ends occurs.

As the third point, the melting points of the above-mentioned phases are low and close to each other. The melting point in the system of GeTe-$Sb_2Te_3$ is near 600° C., and in GeTe-$Bi_2Te_3$ near 570° C.; as they are lower by more than 100° C. comparing with 725° C. of GeTe single substance, melting by a laser beam could be performed relatively easily. There is also a merit that the phase separation mentioned at the second point would be difficult to occur, as the melting points of each phase are close to each other.

The fourth point has been found in the crystallization process. In the system of GeTe-$Sb_2Te_3$/or $Bi_2Te_3$, the stable crystal form is hexagonal, but in the crystallization process by laser radiation, single phase of NaCl-type cubic system consisting of ternary elements, Ge, Te, and Sb or Ge, Te and Bi, is obtained first (this is also the case with Se). It is advantageous that the crystal form obtained is as isotropic as possible (namely, near the atomic structure of liquid phase or amorphous phase) in order to promote smoothly the crystallization. It is assumed that the diffusion distance of atom is shortened and then the annealing time necessary for crystallization is shortened.

Figure 3:
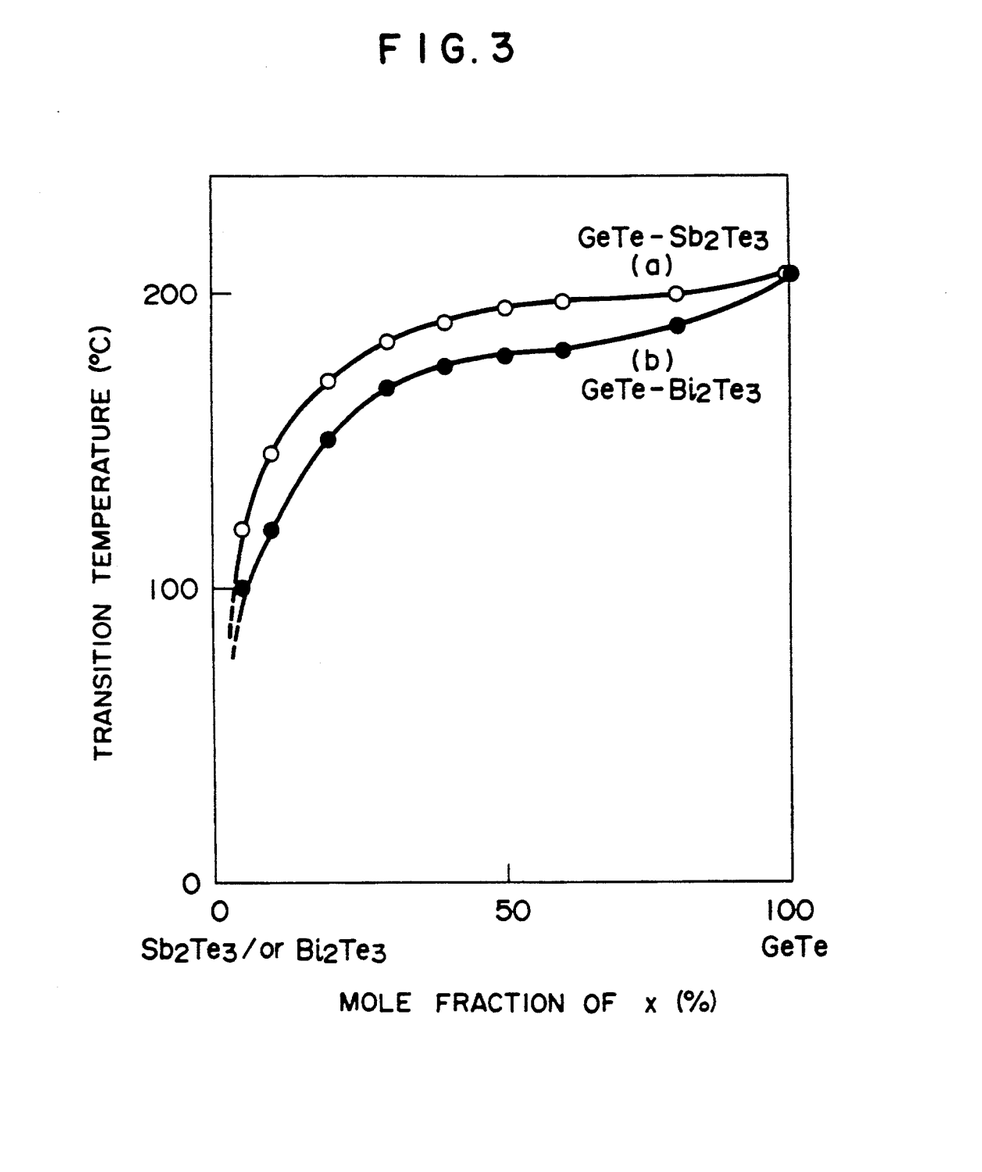
FIG. 3 is a graph showing the phase-transition temperature of recording film with main composition.

As the fifth point, sufficiently high crystallization temperature to keep an amorphous state stable could be obtained through the broad range of composition in the system of GeTe-$Sb_2Te_3$/or $Bi_2Te_3$. As shown in FIG. 3(a) and (b), it has been found that the crystallization temperature sufficiently higher than room temperature was obtained until a close concentration of single phase of $Sb_2Te_3$/or $Bi_2Te_3$.

In this invention, adding to the above-mentioned important points of 1-5, the following merit could be moreover obtained by the addition of Se.

Se is added only in the form of displacement of Te, so that the balance of the concentration between Te and Ge, Sb/or Bi is not demolished. The first addition effect of Se is to increase the viscosity of the system. Added Se forms the Se-compounds, such as GeSe, $GeSe_2$, $Sb_2Se_3$/or $Bi_2Se_3$, when film is crystallized. As these compounds have higher bond energy than the corresponding Te-compounds of the same elements, they are not completely separated even at liquid phase. Therefore, the molten liquid has the high viscosity, and it becomes easy to form amorphous phase. In other words, the condition of rapid cooling to form an amorphous phase becomes slightly mild. It is important that this characteristic does not show the incontinuous change by the addition of Se. It was confirmed that, though the crystallization rate of the system became low inversely proportionally to viscosity, this change varied very continuously according to the concentration of Se and could be controlled. Therefore, in the system design, when it is necessary to make recording and erasing at high speed, the composition with low concentration of Se should be set emphasizing crystallization rate. On the contrary, when it is necessary to make recording and erasing at low speed, the composition with high concentration of Se should be set, emphasizing the condition of amorphous formation. As described above, it is possible to adjust minutely these by the composition. Actually, the limit of Se-concentration is 30 atomic % at most, and there occurs the deficient crystallization rate at higher concentration. The second addition effect of Se is to raise the crystallization temperature of the system. It is especially effective in poor composition of GeTe-component, and it acts to raise the stability of amorphous phase (the recorded signal). On the other hand, the melting point does not so change by addition of Se. It is assumed that this is due to the near melting point between Te- and Se-compounds of the same elements. It is very important that the recording sensitivity does not decrease by the addition of Se.

As described above, it was found that the ternary system of Te, Ge and Sb/or Bi or the quarternary system in which a part of Te was displaced by Se showed superior characteristics as recording material for rewriting type optical disc.

Next, the manufacturing method of this invention is described. A recording medium of this invention could be produced by the method, such as vacuum deposition and sputtering. As for sputtering, it is possible to use an alloy target designed from the desirable composition or a complex mosaic target with the area corresponding to each composition ratio. In the case of vacuum deposition method, the co-evaporation method with plural sources is convenient to control the composition. In this case, it is important that the deposition rate from each source is perfectly independently controlled by preparing for four electron guns and their electric sources and four sensors of film thickness (for example, quartz oscillator). The degree of vacuum at deposition is enough at $10^{-4}$—$10^{-7}$ torr.

This invention is explained in detail by the following detailed examples.

EXAMPLE 1

Sample pieces of the recording film containing triple elements of Te, Ge and Sb/or Bi with various compositions were prepared by the above-described vacuum deposition method, and these characteristics were investigated. The substrate of sample piece is a glass disk with thickness of 0.3 mm and diameter ($\phi$) of 8 mm; the film thickness of a recording layer is about 1000 Å.

Characteristics were evaluated as follows:
i) Phase transition temperature, Tx
ii) Laser power necessary for beginning of amorphous conversion, Pa
iii) Laser irradiation time necessary for beginning of crystallization, $\tau x$ Tx was defined as the temperature beginning the change in optical transmittance, when the as deposited sample piece was gradually heated. Increasing the temperature at the rate of 1° C./sec., the change of the transmittance was monitored by He-Ne laser, and the transformation point was detected. The stability of amorphous phase could be evaluated by this value. Pa shows a value measured radiation power necessary for beginning of amorphization by irradiation of laser beam to the recording film surface of the crystalline state. In this case, each sample was sufficiently precrystallized by 30 $\mu s$ radiation of 2 mW laser power. Afterwards, the pulse width of radiation was fixed at 0.2 $\mu s$, and the radiation laser power beginning the amorphization was measured by changing irradiation power. By this value, the sensitivity of amorphous conversion (the recording sensitivity) can be evaluated. $\tau x$ is the irradiation time necessary for beginning of crystallization, in the case of radiation at spot of a 1 $\mu m$ or less in diameter on the recording film at "as deposited" state by the light of laser diode through a lens system. In this case, the evaluation of $\tau x$ was undertaken from two points of view assuming two crystallization processes. One of them is $\tau x_1$, the radiation time necessary for beginning of crystallization by the radiation of relatively weak laser power (2 mW), assuming the crystallization process at solid phase. The other is $\tau x_2$, the radiation time necessary for beginning of crystallization in the case of quenching from molten state by the radiation power of more than the above Pa. $\tau x_1$ is the item related both with the energy necessary for beginning of crystallization and the rate of the crystallization. This value is very correlated with Tx. On the other hand, $\tau x_2$ is evaluated as the rate of crystallization itself; in this case, the same laser power as required for amorphization.

FIG. 3 shows the behavior of Tx in the compositions on the line which links the composition point of GeTe and that of $Sb_2Te_3$/or $Bi_2Te_3$ at the triangle diagram of Ge-Te-Sb/or Bi.

From this figure, the phase transition temperature in the systems of $GeTe-Sb_2Te_3$ and $GeTe-Bi_2Te_3$ is higher than 100° C. (sufficiently higher than room temperature) in the case of more than 3-5% of x in the above-mentioned formula, and it shows that the amorphous phase is very stable.

Figure 4:
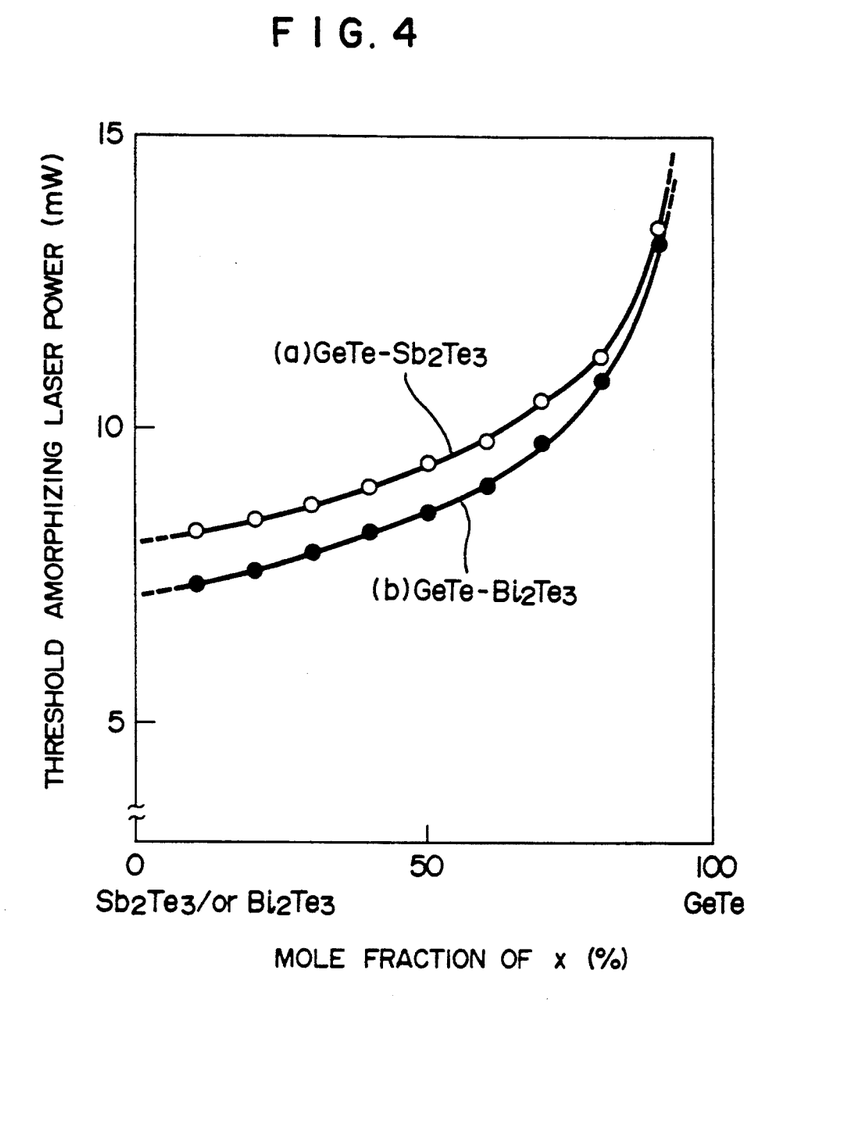
FIG. 4 is a graph showing amorphizing sensitivity of recording film with main composition.

FIG. 4 shows the sensitivity of amorphization, Pa in the same composition as above. From this figure, Pa in the systems of $GeTe-Sb_2Te_3$ and $GeTe-Bi_2Te_3$ has a tendency to increase as the proportion of GeTe increases, and it increases very much in the case of more than 80-90% of x proportion. Namely, if the proportion of GeTe or exist in the region of 80% or less of x, it is shown that a high recording sensitivity could be obtained.

Figure 5:
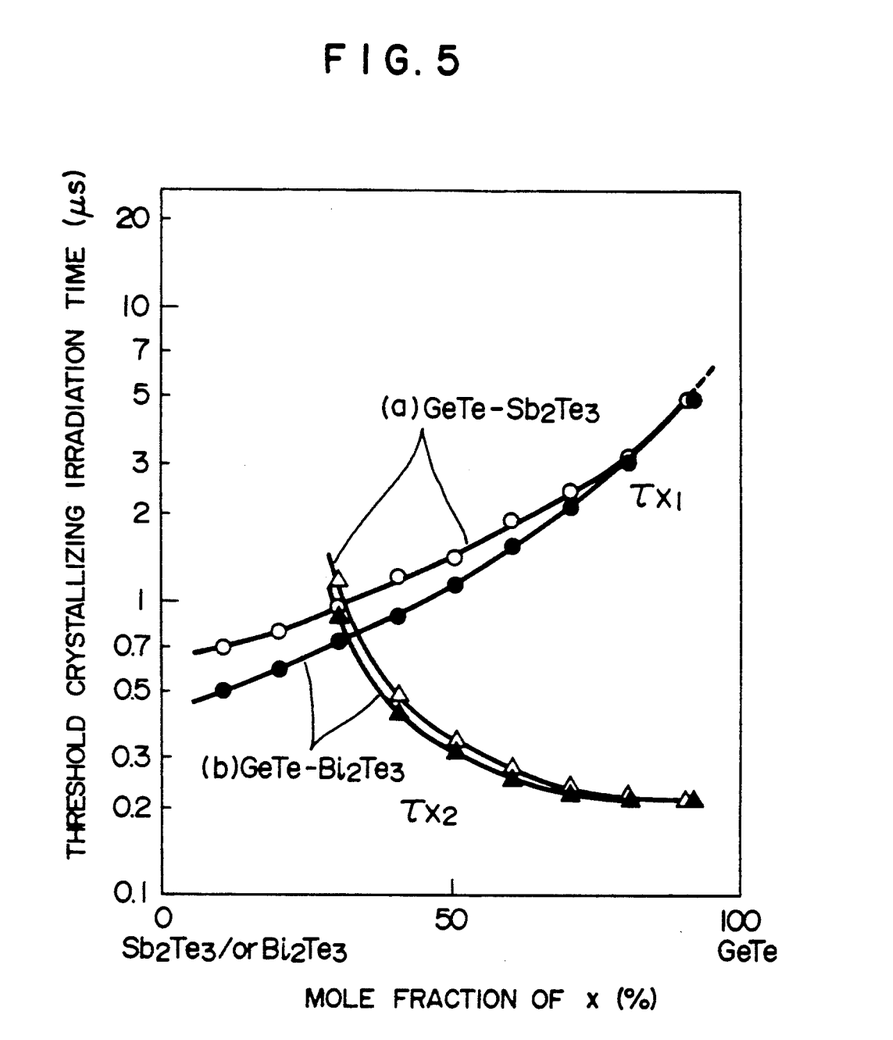
FIG. 5 is a graph showing a crystallization speed of recording film with main composition.

FIG. 5 shows $\tau x_1$ and $\tau x_2$, the irradiation time necessary for beginning of crystallization in the same composition as above. From this figure, it is found that $\tau x_1$ has a tendency to increase as the proportion of GeTe increases, $\tau x_2$ has a tendency to increase as the proportion of GeTe decreases, and it does not exist in the case of less than 30% of x. The curves of $\tau x_1$ and $\tau x_2$ cross at around 30-40% of x-concentration. Therefore, it is found that the region of 5-40% of x in the composition ratio is suitable for erasing method of solid phase and the region of 40% or more of x ratio is suitable for erasing method of liquid phase.

Next, the example in which a part of Te was displaced by Se in the same composition on the above-mentioned line is described.

EXAMPLE 2

Selecting $Ge_{20}Te_{56}Sb_{24}$ as a typical composition in Example 1, a part of Te has been displaced by Se in the form of $Te_{56-x}Se_xGe_{20}Sb_{24}$, and it was prepared as a sample. By the same measurement as adapted in Example 1, the following results have been obtained.

First, it was confirmed that Tx increased monotonically as the concentration of Se increased.

Figure 6:
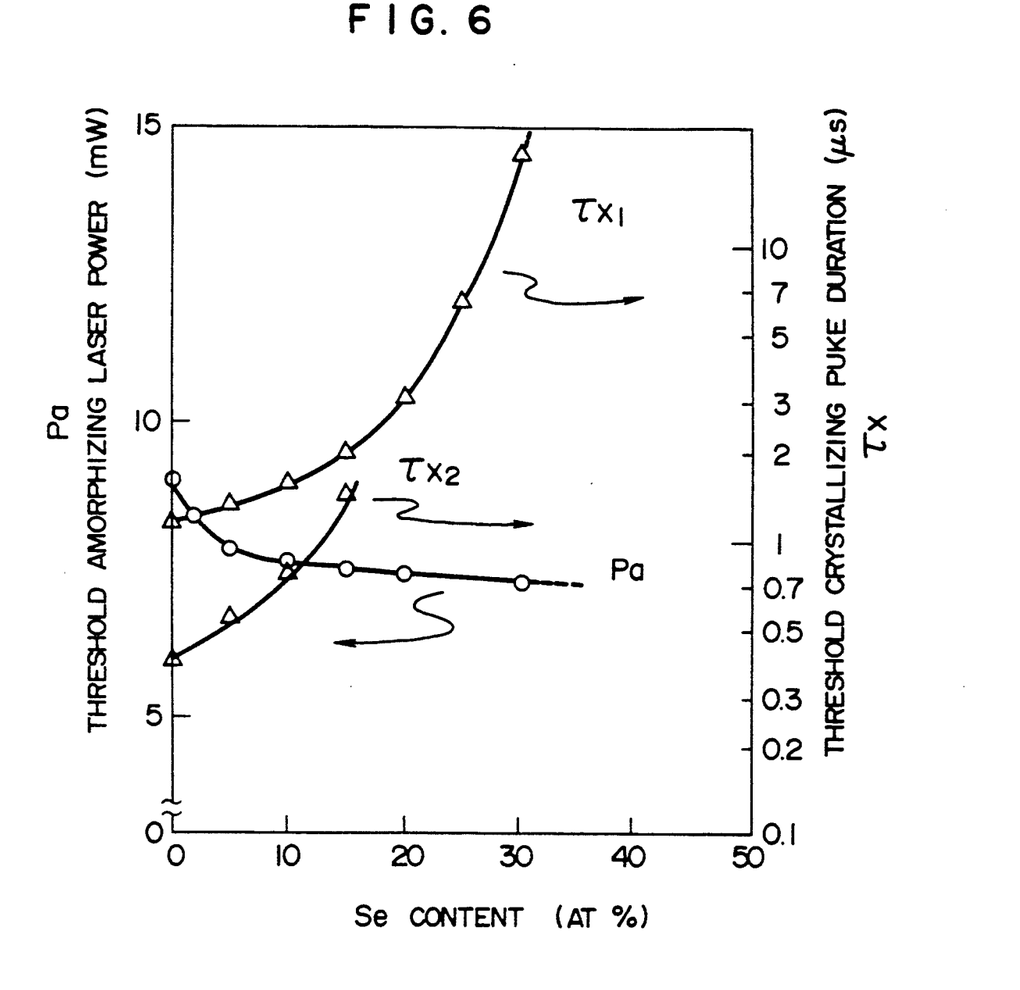
FIG. 6 is a graph showing the change in amorphizing sensitivity and crystallization speed in the case of addition of Se to main composition.

FIG. 6 shows the change in the sensitivity of amorphization Pa, and the crystallization time $\tau x_1$ and $\tau x_2$ with the change in Se concentration. From this figure, it is found that Pa decreases by addition of Se, and saturates at about 10 atomic %; $\tau x_1$ and $\tau x_2$ increases continuously and monotonically as the concentration of Se increases. $\tau x_1$ increases extremely over 20 atomic % of Se concentration; $\tau x_2$ increases monotonically until the concentration of Se is about 15 atomic %, but it does not exist at higher than 15 atomic % of Se concentration (namely, crystallization becomes difficult).

From these results, it was shown that it was possible to change continuously recording sensitivity and erasing rate by the displacement of Se with Te and the fine controlling of film characteristics is easily undertaken according to the specification of the system. At that time, the addition concentration of Se is 30 atomic % at most, and the crystallization rate is reduced extremely at higher concentration. In order to crystallize from liquid phase, the concentration of Se is 15 atomic % at most. Moreover, under consideration of the recording sensitivity, the concentration of Se is suitable at 5-15 atomic %.

Similar experiment was undertaken for the different composition of Te-Ge-Sb, and the same tendency was obtained as addition effects of Se. In the system of Te-Ge-Bi, the similar results were obtained.

EXAMPLE 3

The same experiment as adopted in Example 1 was undertaken to the composition come off the above-mentioned composition-line. Fixing the concentration of Ge for the composition on the above line, the composition ratio of Sb/or Bi was changed in the range of ±15 atomic %. As a result, the large difference from the composition on the line was not produced as to Tx and Pa, but $\tau x$ showed a rather large value when the composition came off the line to both sides.

EXAMPLE 4

At each composition point of Examples 1, 2 and 3, the disk was prepared, and the repeating characteristics of recording/erasing were investigated. An optical disk was prepared by laminating ZnS and a recording layer in the order, i.e. ZnS, a recording layer, ZnS ..., on the substrate of PMMA resin of 130 mm in diameter and thickness of 1.2 mm with the light guidetrack, and the protecting plate using the UV-ray curing resin on the surface. The thickness of each layer was about 800 Å, 1000 Å, and 1600 Å in the order from the lowest layer to the upper ones, and these were designed to raise the effect of light-absorption in the recording layer. A laser beam was supplied from the side of substrate. A dynamic tester (deck) was equipped with a circular laser spot of 0.9 μm in diameter for recording and an elliptic laser spot of 1×8 μm for erasing, and the two spots were continuously arranged in one optical head. The repeating life of recording/erasing was investigated at a peripheral speed of 5 m/s. Each power of recording and erasing was suitably selected according to the disk characteristics, and the recording was made at simple frequency mode of 2 MHz. The limit of life was defined as the number of times showing the decrease of 3 dB from initial C/N. The following conclusions of 1)-4) were obtained.

i) At the composition on the line, there exists a broad power condition making possible repeating of more than $10^6$ times at more than 50 dB of initial C/N.

ii) Coming off far from the composition on the line, the noise is produced at about $10^2$ time repeatings.

iii) As shown by $A_1$, $B_1$, $C_1$ and $D_1$ in FIG. 2, the permissible width coming off the composition was +10 atomic % to Sb rich side and −10 atomic % to Sb poor side in the case of the fixed Ge concentration; in this range, there exists the power condition making possible repeating of $10^4$ times. Similarly, in the range of +7 atomic % and −5 atomic % ($A_2$, $B_2$, $C_2$ and $D_2$), there exists the power condition making possible repeating of $10^5$ times. In the range of +5 atomic % and −3 atomic % ($A_3$, $B_3$, $C_3$ and $D_3$), there exists the power condition making possible repeating of $10^6$ times, though its range is narrower than the composition on the line. Above all, in the range of $A_4$, $B_4$, $C_4$ and $D_4$, it is possible to repeat recording/erasing with a comparatively low power. Tab. 1 shows the composition of each point.

TABLE 1

| | Coordinates at each composition point each composition (Te, Ge, Sb/or Bi) | | | |
|---|---|---|---|---|
| | A | B | C | D |
| 1 | (38, 59, 3) | (50, 2, 48) | (70, 2, 28) | (63, 34, 3) |
| 2 | (42, 55, 3) | (53, 2, 45) | (64.5, 2, 33.5) | (57, 40, 3) |
| 3 | (44.5, 52.5, 3) | (55, 2, 43) | (63, 2 35) | (54, 43, 3) |
| 4 | (46.5, 41.5, 12) | (54, 6.5, 39.5) | (62, 4, 34) | (55, 39, 6) | iv) The Se concentration has not marked correlation with cyclability.

EXAMPLE 5

The cyclability of disk equipped with the film of ternary elements system, $Te_{58}Ge_{12}Sb_{30}$ and the film of quaternary elements system, $Te_{48}Ge_{12}Sb_{30}Se_{10}$ as a disk with typical composition were investigated by the same method as adopted in Example 4.

As for the former disk, the results of the initial C/N of 53 dB and the C/N of 51 dB after $10^5$ time repeating were obtained by repeating recording/erasing at recording power of 8 mW and erasing power of 8 mW.

As for the latter disk, the results of the initial C/N of 54 dB and the C/N of 52 dB after $10^5$ times repeating were obtained by repeating recording/erasing at recording power of 7 mW and erasing power of 10 mW.

Similar experiments were undertaken with Sb instead of Bi in the above composition. In the disk of the triple elements system, $Te_{58}Ge_{12}Bi_{30}$, the results of initial C/N of 50 db and the C/N of 48 dB after the repeating of $10^5$ times were obtained at the recording power of 7 mW and the erasing power of 7 mW. Also, in the disk of the quadruple elements system, $Te_{48}Ge_{12}Sb_{30}Se_{10}$, the results of initial C/N of 52 dB and the C/N of 50 dB after repeating $10^5$ times were obtained at the recording power of 6 mW and the erasing power of 9 mW.

EXAMPLE 6

Using the disk of Example 5, the environmental test was undertaken. In each disk, the signal was recorded at the track where recording/erasing were repeated $10^5$ times and the right-/left-hands neighboring tracks; then, C/N was measured at these tracks. C/N of each track was measured after two month leaving in thermohygrostat (80° C., 80% RH). As a result, the change of C/N in each track was as negligibly small as $-0.5 \sim -1.5$ dB. By the observation with a metal microscope, the remarkable rust or crack was not found in each disk.

As described above, the optical information-recording medium with high sensitivity, superior heat-and-humidity resistance, and long repeating life of recording/erasing, was provided by this invention.

What is claimed is:

1. A method of using a Ge-Sb-Te ternary alloy thin film formed on a substrate for reversible information storage using laser irradiations, comprising the steps of
   a) pre-crystallizing said Ge-Sb-Te ternary alloy thin film;
   b) melting and quenching the pre-crystallized thin film locally, transforming said local area into an amorphous phase; and
   c) annealing said amorphous area and transforming said amorphous area into a crystalline phase.

2. The method according to claim 1, wherein the Ge-Sb-Te ternary alloy thin film is a mixture of at least two ternary stoichiometric compounds selected from the group consisting of $GeSb_4Te_7$, $GeSb_2Te_4$ and $Ge_2Sb_2Te_5$.

3. The method according to claim 1, wherein the Ge-Sb-Te ternary alloy thin film is a ternary stoichiometric compound selected from the group consisting of $GeSb_4Te_7$, $GeSb_2Te_4$ and $Ge_2Sb_2Te_5$.

* * * * *